United States Patent
Roddy et al.

(10) Patent No.: US 7,708,071 B2
(45) Date of Patent: May 4, 2010

(54) CEMENT COMPOSITIONS COMPRISING ALUMINUM CHLORIDE AND ASSOCIATED METHODS

(75) Inventors: Craig W. Roddy, Duncan, OK (US); Ricky L. Covington, Duncan, OK (US); Jiten Chatterji, Duncan, OK (US); Bobby J. King, Duncan, OK (US); D. Chad Brenneis, Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 12/191,529

(22) Filed: Aug. 14, 2008

(65) Prior Publication Data

US 2010/0038084 A1 Feb. 18, 2010

(51) Int. Cl.
 *E21B 33/13* (2006.01)
(52) U.S. Cl. ............................ 166/292; 166/285
(58) Field of Classification Search ............ 166/285, 166/292, 293
 See application file for complete search history.

(56) References Cited

U.S. PATENT DOCUMENTS

| | | | |
|---|---|---|---|
| 2,929,729 A | 3/1960 | Waggoner | |
| 4,014,174 A * | 3/1977 | Mondshine | ........ 405/233 |
| 4,068,676 A | 1/1978 | Thorn et al. | |
| 4,304,676 A | 12/1981 | Hall | |
| 4,316,810 A | 2/1982 | Burnham | |
| 4,366,071 A | 12/1982 | McLaughlin et al. | |
| 4,366,072 A | 12/1982 | McLaughlin et al. | |
| 4,366,073 A | 12/1982 | McLaughlin et al. | |
| 4,366,074 A | 12/1982 | McLaughlin et al. | |
| 4,374,739 A | 2/1983 | McLaughlin et al. | |
| 4,444,668 A | 4/1984 | Walker et al. | |
| 4,462,718 A | 7/1984 | McLaughlin et al. | |
| 4,552,215 A | 11/1985 | Almond et al. | |
| 4,600,057 A | 7/1986 | Borchardt | |
| 4,606,772 A | 8/1986 | Almond et al. | |
| 4,662,943 A * | 5/1987 | Baker et al. | ........ 106/720 |
| 4,664,713 A | 5/1987 | Almond et al. | |
| 5,002,127 A | 3/1991 | Dalrymple et al. | |
| 5,147,565 A * | 9/1992 | Bour et al. | ........ 106/603 |
| 5,151,203 A | 9/1992 | Riley et al. | |
| 5,271,464 A | 12/1993 | McCabe | |
| 5,346,550 A | 9/1994 | Kunzi et al. | |
| 5,447,198 A | 9/1995 | Kunzi et al. | |
| 5,488,991 A | 2/1996 | Cowan et al. | |
| 5,514,645 A | 5/1996 | McCabe et al. | |
| 5,554,218 A | 9/1996 | Evans et al. | |
| 5,749,418 A * | 5/1998 | Mehta et al. | ........ 166/292 |
| 5,811,527 A | 9/1998 | Ishitoku et al. | |
| 5,897,699 A * | 4/1999 | Chatterji et al. | ........ 106/678 |
| 5,968,255 A | 10/1999 | Mehta et al. | |
| 5,972,103 A | 10/1999 | Mehta et al. | |
| 6,063,738 A | 5/2000 | Chatterji et al. | |
| 6,367,550 B1 | 4/2002 | Chatterji et al. | |
| 6,457,524 B1 | 10/2002 | Roddy | |
| 6,506,711 B1 | 1/2003 | Shuchart et al. | |
| 6,511,944 B2 | 1/2003 | Taylor et al. | |
| 6,531,427 B1 | 3/2003 | Shuchart et al. | |
| 6,544,934 B2 | 4/2003 | Taylor et al. | |
| 6,547,871 B2 | 4/2003 | Chatterji et al. | |
| 6,797,054 B2 | 9/2004 | Chatterji et al. | |
| 7,021,380 B2 | 4/2006 | Caveny et al. | |
| 7,026,272 B2 | 4/2006 | Reddy et al. | |
| 7,066,262 B2 | 6/2006 | Funkhouser | |
| 7,073,585 B2 | 7/2006 | Morgan et al. | |
| 7,163,060 B2 | 1/2007 | Weiss et al. | |
| 7,191,834 B2 * | 3/2007 | Lewis et al. | ........ 166/293 |
| 7,213,646 B2 | 5/2007 | Roddy et al. | |
| 7,217,441 B2 | 5/2007 | Bour et al. | |
| 7,285,165 B2 | 10/2007 | Caveny et al. | |
| 7,314,850 B2 | 1/2008 | Taylor et al. | |
| 7,316,744 B2 | 1/2008 | De La Roij | |
| 7,328,744 B2 | 2/2008 | Taylor et al. | |
| 7,337,842 B2 | 3/2008 | Roddy et al. | |
| 7,381,263 B2 | 6/2008 | Roddy et al. | |
| 7,384,893 B2 | 6/2008 | Morgan et al. | |
| 7,384,894 B2 | 6/2008 | Morgan et al. | |

(Continued)

FOREIGN PATENT DOCUMENTS

WO WO 99/37594 * 7/1999

OTHER PUBLICATIONS

Halad®-9 Fluid-Loss Additive, 2007.

(Continued)

*Primary Examiner*—Zakiya W Bates
*Assistant Examiner*—Angela M DiTrani
(74) *Attorney, Agent, or Firm*—Craig W. Roddy; Tumey, LLP

(57) ABSTRACT

Methods and compositions including, in one embodiment, a method of cementing in a subterranean formation comprising introducing a cement composition into the subterranean formation, wherein the cement composition comprises cement; a strength-enhancing additive consisting essentially of aluminum chloride and a metal halide; and water; and allowing the cement composition to set. Another method of cementing in a subterranean formation comprises preparing a cement composition that comprises cement, a strength-enhancing additive consisting essentially of aluminum chloride and a metal halide, and water, wherein the aluminum chloride and metal halide are not combined prior to preparing the cement composition; introducing the cement composition into the subterranean formation; and allowing the cement composition to set.

24 Claims, No Drawings

U.S. PATENT DOCUMENTS

| | | |
|---|---|---|
| 2004/0040475 A1* | 3/2004 | De La Roij .................. 106/819 |
| 2005/0121194 A1 | 6/2005 | Morgan et al. |
| 2005/0124503 A1 | 6/2005 | Morgan et al. |
| 2006/0086503 A1 | 4/2006 | Reddy et al. |
| 2006/0243449 A1 | 11/2006 | Welton et al. |
| 2006/0247135 A1 | 11/2006 | Welton et al. |
| 2008/0000641 A1 | 1/2008 | Caveny et al. |
| 2008/0041584 A1 | 2/2008 | Reddy et al. |
| 2008/0041585 A1 | 2/2008 | Reddy et al. |
| 2008/0041591 A1 | 2/2008 | Reddy et al. |
| 2009/0194283 A1* | 8/2009 | Ermel et al. ................ 166/292 |

OTHER PUBLICATIONS

Halad®-23 Fluid-Loss Additive, 2007.
Halad®-344 Fluid-Loss Additive, 2007.
Halad®-413 Fluid-Loss Additive, 2007.
Silicalite™ Cement Addtive, 2007.
UCS Universal Cement Systems Additive, 2006.

* cited by examiner

CEMENT COMPOSITIONS COMPRISING ALUMINUM CHLORIDE AND ASSOCIATED METHODS

BACKGROUND

The present invention relates to subterranean cementing operations and, more particularly, in certain embodiments, to cement compositions comprising aluminum chloride and associated methods. Embodiments of the cement compositions further may comprise iron chloride and/or an alkali or alkaline-earth metal halide.

Cement compositions may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string should function to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

Once set, the cement sheath may be subjected to a variety of shear, tensile, impact, flexural, and/or compressive stresses that may lead to failure of the cement sheath, resulting, inter alia, in fractures, cracks, and/or debonding of the cement sheath from the pipe string and/or the formation. This may lead to undesirable consequences such as lost production, environmental pollution, hazardous rig operations resulting from unexpected fluid flow from the formation caused by the loss of zonal isolation, and/or hazardous production operations.

SUMMARY

The present invention relates to subterranean cementing operations and, more particularly, in certain embodiments, to cement compositions comprising aluminum chloride and associated methods. Embodiments of the cement compositions further may comprise iron chloride and/or an alkali or alkaline-earth metal halide.

An embodiment of the present invention provides a method of cementing in a subterranean formation comprising: introducing a cement composition into the subterranean formation, wherein the cement composition comprises: cement; a strength-enhancing additive consisting essentially of aluminum chloride and a metal halide, wherein the metal halide comprises at least one metal halide selected from the group consisting of iron chloride, an alkali metal halide, and an alkaline-earth metal halide; and water; and allowing the cement composition to set.

Another embodiment of the present invention provides a method of cementing in a subterranean formation comprising: preparing a cement composition that comprises cement, a strength-enhancing additive consisting essentially of aluminum chloride and a metal halide, and water, wherein the metal halide comprises at least one metal halide selected from the group consisting of iron chloride, an alkali metal halide, and an alkaline-earth metal halide, and wherein the aluminum chloride and the metal halide are not combined prior to preparing the cement composition; introducing the cement composition into the subterranean formation; and allowing the cement composition to set.

Another embodiment of the present invention provides a method of cementing in a subterranean formation comprising: providing a cement composition comprising cement, aluminum chloride, a surfactant, and water; and introducing a gas into the cement composition to form a foamed cement composition; introducing the foamed cement composition into the subterranean formation; and allowing the cement composition to set.

Another embodiment of the present invention provides a cement composition comprising: cement; a strength-enhancing additive consisting essentially of aluminum chloride and a metal halide, wherein the metal halide comprises at least one metal halide selected from the group consisting of iron chloride, an alkali metal halide, and an alkaline-earth metal halide; and water.

Another embodiment of the present invention provides a foamed cement composition comprising: cement; aluminum chloride; a surfactant; and water.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to subterranean cementing operations and, more particularly, in certain embodiments, to cement compositions comprising aluminum chloride and associated methods. Embodiments of the cement compositions further may comprise iron chloride and/or an alkali or alkaline-earth metal halide.

There may be several potential advantages to the methods and compositions of the present invention, only some of which may be alluded to herein. One of the many potential advantages of the methods and compositions of the present invention is that it is believed that the compositions and methods of the present invention may provide cement compositions with improved properties, including, but not limited to, improved compressive strength and/or reduced porosity. By way of example, aluminum chloride in conjunction with an alkali or alkaline-earth metal halide may be included a cement composition to improve the compressive strength of the set cement composition. By way of further example, aluminum chloride may be included in a strength-enhancing additive with an alkali or alkaline-earth metal halide. It is believed that the strength-enhancing additive may synergistically interact with the components of a cement composition to improve the compressive strength of the set cement composition. Furthermore, it is believed that the use of aluminum chloride in conjunction with the alkali or alkaline earth-metal halide improves mechanical properties of the cement composition as reflected by Young's Modulus and Poisson's ratio. By way of further example, an additive comprising aluminum chloride and iron chloride and/or an alkali or alkaline-earth metal halide may be included in a cement composition. It is believed that the additive may improve one or more properties of the cement composition, including, but not limited to, compressive strength, rheology, thickening time, and fluid loss control.

An embodiment of the cement compositions of the present invention comprises cement, aluminum chloride, and water. In accordance with embodiments of the present invention, the cement compositions of the present invention may also comprise an alkali or alkaline-earth metal halide, iron chloride, or combinations thereof. The salts (e.g., aluminum chloride, alkali or alkaline-earth metal halide, and iron chloride) are not pre-blended, in certain embodiments. For example, the salts may be added to the water, dry blended with the cement, or added to a slurry comprising the cement and the water, without pre-blending of the salts. In other words, each salt may be individually added during preparation of the cement compositions. Among other things, this may facilitate preparation of the cement composition, in that preparation of an additive comprising aluminum chloride, alkali or alkaline-earth metal halide, and/or iron chloride is not required.

Those of ordinary skill in the art will appreciate that the cement compositions generally should have a density suitable for a particular application. By way of example, the cement composition may have a density of about 4 pounds per gallon ("lb/gal") to about 20 lb/gal. In certain embodiments, the cement compositions may have a density of from about 8 lb/gal to about 17 lb/gal. Embodiments of the cement compositions may be foamed or unfoamed or may comprise other means to reduce their densities, such as hollow microspheres, low-density elastic beads, or other density-reducing additives known in the art. Those of ordinary skill in the art, with the benefit of this disclosure, will recognize the appropriate density for a particular application.

Embodiments of the cement compositions of the present invention may comprise a cement. Any of a variety of cements suitable for use in subterranean cementing operations may be used in accordance with embodiments of the present invention. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, silica cements and combinations thereof. In certain embodiments, the hydraulic cement may comprise a Portland cement. The Portland cements that may be suited for use in embodiments of the present invention include those classified as Class A, C, H and G cements according to American Petroleum Institute, *API Specification for Materials and Testing for Well Cements*, API Specification 10, Fifth Ed., Jul. 1, 1990.

Embodiments of the cements composition of the present invention may comprise aluminum chloride. As described above, the aluminum chloride may be included in a cement composition to improve the compressive strength and mechanical properties of the set cement composition. Accordingly, the aluminum chloride may be present in the cement compositions of the present invention, for example, in an amount sufficient to provide a desired compressive strength. In certain embodiments, the aluminum chloride may be present in an amount of about 1% to about 5% by weight of the cement on a dry basis ("bwoc") (e.g., about 1.5%, about 2%, about 2.5%, about 3%, about 3.5%, about 4%, about 4.5%, etc.) and, alternatively, in an amount of about 1% to about 2% bwoc.

The water used in embodiments of the cement compositions of the present invention may be fresh water or salt water. As used herein, the term "salt water" refers to unsaturated salt water and saturated salt water, including brines and seawater. Generally, the water may be from any source, provided that it should not contain an excess of compounds that may undesirably affect other components in the foamed cement composition. Further, the water may be present in an amount sufficient to form a pumpable slurry. In certain embodiments, the water may be present in the cement composition in an amount of about 33% to about 200% bwoc and, alternatively, in an amount of about 35% to about 70% bwoc. One of ordinary skill in the art with the benefit of this disclosure will recognize the appropriate amount of water for a chosen application.

An alkali or alkaline-earth metal halide, preferably chloride, may be included in embodiments of the cement compositions of the present invention. Any of a variety of alkali or alkaline-earth metal halides may be used, including, but not limited to, chlorides, such as sodium chloride, potassium chloride, magnesium chloride, calcium chloride, strontium chloride, barium chloride, ammonium chloride, and combinations thereof. It is believed that the alkali or alkaline-earth metal halide may synergistically interact with the aluminum chloride and other components of the cement composition to improve the compressive strength of the set cement composition. In certain embodiments, a strength-enhancing additive consisting essentially of the aluminum chloride and the alkali or alkaline-earth metal halide may be included in embodiments of the cement compositions of the present invention. The aluminum chloride and the alkali or alkaline-earth metal halide may be separately included in the cement composition or may be pre-mixed prior to combination with other components of the cement composition, in accordance with embodiments of the present invention. By way of example, the aluminum chloride and the alkali or alkaline-earth metal halide may be individually combined with the cement component of the cement compositions. Alternatively, by way of further example, the aluminum chloride and the alkali or alkaline-earth metal halide may be individually combined with the water component of the cement compositions.

Where used, the alkali or alkaline-earth metal halide, preferably chloride, may be present in embodiments of the cement compositions of the present invention, for example, in an amount sufficient to provide a desired compressive strength. In certain embodiments, the alkali or alkaline-earth metal halide may be present in an amount of about 1% to about 5% bwoc (e.g., about 1.5%, about 2%, about 2.5%, about 3%, about 3.5%, about 4%, about 4.5%, etc.) and, alternatively, in an amount of about 1% to about 2% bwoc.

Iron chloride optionally may be included in embodiments of the cement compositions of the present invention. Examples of suitable iron chlorides include, but are not limited to, ferrous chloride, ferric chloride, and combinations thereof. It is believed that the iron chloride may improve the compressive strength of the set cement composition. In certain embodiments, a strength-enhancing additive consisting essentially of the aluminum chloride and the iron chloride may be included in embodiments of the cement compositions of the present invention. The aluminum chloride and the iron chloride may be separately included in the cement composition or may be pre-mixed prior to combination with other components of the cement composition, in accordance with embodiments of the present invention. Where used, iron chloride may be present in embodiments of the cement compositions of the present invention, for example, in an amount sufficient to provide a desired compressive strength. In certain embodiments, the iron chloride may be present in an amount of about 1% to about 5% bwoc (e.g., about 1.5%, about 2%, about 2.5%, about 3%, about 3.5%, about 4%, about 4.5%, etc.) and, alternatively, in an amount of about 1% to about 2% bwoc.

A cement set retarder optionally may be included in embodiments of the cement compositions of the present invention. Examples of suitable retarders include, but are not limited to, lignosulfonates, sulfomethylated lignosulfonates, tartaric acid, phosponates, and combinations thereof. An example of a suitable set retarder is available from Halliburton Energy Services, Inc., as HR®-25 cement retarder. Where used, the set retarder may be present in an amount of about 0.1% to about 3% bwoc and, alternatively, in an amount of about 0.1% to about 2.5% bwoc.

As mentioned previously, in certain embodiments, the cement compositions of the present invention may be foamed with a gas, for example, to provide a cement composition with a reduced density. Accordingly, in some embodiments, the cement compositions may be foamed and comprise cement, aluminum chloride, a surfactant, water, and a gas. Embodiments of the cement compositions further may comprise iron chloride and/or an alkali or alkaline-earth metal halide. Other suitable additives, such as those discussed previously, also may be included in embodiments of the foamed cement compositions of the present invention as desired by those of ordinary skill in the art, with the benefit of this disclosure. The gas used in embodiments of the foamed cement compositions of the present invention may be any gas suitable for foaming a cement composition, including, but not limited to, air, nitrogen, and combinations thereof. Generally, the gas should be present in the foamed cement compositions of the present invention in an amount sufficient to form the desired foam. In certain embodiments, the gas may be present in the foamed cement compositions of the present invention in an amount in the range of about 5% to about 80% by volume of the foamed cement composition at atmospheric pressure, alternatively, in an amount of about 5% to about 55% by volume, and, alternatively, in an amount of about 15% to about 30% by volume.

Where foamed, embodiments of the settable compositions of the present invention comprise a surfactant for providing a suitable foam. In some embodiments, the surfactant comprises a foaming and stabilizing surfactant composition. As used herein, a "foaming and stabilizing surfactant composition" refers to a composition that comprises one or more surfactants and, among other things, facilitates the foaming of a cement composition and also stabilizes the resultant foamed settable composition formed therewith. Any suitable foaming and stabilizing surfactant composition may be used in the settable compositions of the present invention. Suitable foaming and stabilizing surfactant compositions may include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. In one certain embodiment, the foaming and stabilizing surfactant composition comprises a mixture of an ammonium salt of an alkyl ether sulfate, a cocoamidopropyl betaine surfactant, a cocoamidopropyl dimethylamine oxide surfactant, sodium chloride, and water. A suitable example of such a mixture is ZONESEAL® 2000 foaming additive, available from Halliburton Energy Services, Inc. Suitable foaming and stabilizing surfactant compositions are described in U.S. Pat. Nos. 6,797,054, 6,547,871, 6,367,550, 6,063,738, and 5,897,699, the entire disclosures of which are incorporated herein by reference.

Generally, the surfactant may be present in the foamed settable compositions of the present invention in an amount sufficient to provide a suitable foam. In some embodiments, the surfactant may be present in an amount in the range of about 0.8% and about 5% by volume of the water ("bvow").

Other additives suitable for use in subterranean cementing operations also may be added to embodiments of the cement compositions of the present invention. Examples of such additives include, but are not limited to, strength-retrogression additives, fluid-loss control additives, weighting agents, weight-reducing additives, heavyweight additives, lost-circulation materials, filtration-control additives, dispersants, defoaming agents, and combinations thereof. Specific examples of these, and other, additives include crystalline silica, amorphous silica, salts, fibers, hydratable clays, vitrified shale, microspheres, fly ash, lime, latex, thixotropic additives, combinations thereof and the like. Fluid loss control additives may be used, for example, to prevent dehydration of embodiments of the cement compositions of the present invention during placement in the subterranean formation, e.g., while in the well bore. Examples of suitable fluid loss control additives may include HALAD™ 9 fluid loss additive, HALAD™ 23 fluid loss additive, HALAD™ 344 fluid loss additive, and HALAD™ 413 fluid loss additive, which are available from Halliburton Energy Services, Inc. Where used, the fluid loss control additive may be present in an amount of about 0.5% to about 2.5% bwoc. A person having ordinary skill in the art, with the benefit of this disclosure, will readily be able to determine the type and amount of additive useful for a particular application and desired result. It should be noted that the addition of amorphous silica below 230° F. does not appear to contribute to compressive strength.

Embodiments the cement compositions of the present invention may be prepared in accordance with any suitable technique. In some embodiments, the desired quantity of water may be introduced into a cement blender followed by the cement. Additional liquid additives, if any, may be added to the water as desired prior to addition of the cement, and additional solid additives, if any, may be added to the water and cement, as desired, prior to mixing. This mixture may be agitated for a sufficient period of time to form a pumpable non-foamed slurry. This non-foamed slurry may then be introduced into a well bore and allowed to set. In the foamed embodiments, the non-foamed slurry may be pumped to the well bore, and a surfactant composition may be metered into the non-foamed slurry followed by injection of a gas, e.g., at a foaming mixing "T," in an amount sufficient to foam the slurry thereby forming a foamed cement composition, in accordance with one embodiment of the present invention. After foaming, the foamed cement composition may be introduced into a well bore and allowed to set. As will be appreciate by those of ordinary skill in the art, with the benefit of this disclosure, other suitable techniques for preparing cement compositions may be used in accordance with embodiments of the present invention.

As will be appreciated by those of ordinary skill in the art, embodiments of the cement compositions of the present invention may be used in a variety of subterranean applications, including primary and remedial cementing. By way of example, embodiments of the cement compositions may be introduced into a well bore and allowed to set. Embodiments of the cement compositions may comprise cement, aluminum chloride, and water. Embodiments of the cement compositions further may comprise iron chloride and/or an alkali or alkaline-earth metal halide. In certain embodiments, the cement compositions further may comprise In example primary cementing embodiments, a cement composition may be introduced into a space between a subterranean formation and a pipe string located in the subterranean formation. The cement composition may be allowed to set to form a hardened mass in the space between the subterranean formation and the pipe string. In addition, in example remedial cementing embodiments, a cement composition may used, for example, in squeeze cementing operations or in the placement of cement plugs.

To facilitate a better understanding of the present invention, the following examples of certain aspects of some embodiments are given. In no way should the following examples be read to limit, or define, the entire scope of the invention.

Example 1

A sample composition was prepared having a density of 16.4 lb/gal and comprised of Portland class H cement, hydrated calcium chloride in an amount of 4% bwoc, water. The composition was dry blended and then mixed with water for 35 seconds at 12,000 rpm in a Waring blender. After sample preparation, 24-hour compressive strength tests at 80° F. were performed in accordance with the procedures set forth in the API Specification 10 mentioned above.

Another sample composition was prepared having a density of 16.4 lb/gal and comprised of Portland class H cement, hydrated calcium chloride in an amount of 2% bwoc, hydrated aluminum chloride in an amount of 2% bwoc, and amorphous silica (SILICALITE™ cement additive, available form Halliburton Energy Services) in an amount of 1% bwoc, and water. The composition was dry blended and then mixed with water for 35 seconds at 12,000 rpm in a Waring blender. After sample preparation, 24-hour compressive strength tests at 80° F. were performed in accordance with the procedures set forth in the API Specification 10 mentioned above.

The above tests were repeated by replacing the calcium chloride with hydrated magnesium chloride, sodium chloride, and potassium chloride respectively.

In addition, to determine the effect of silica on the set cement compositions, additional tests were performed without the inclusion of amorphous silica.

The results of these tests are provided in the table below.

TABLE 1

| Sample No. | Water (% bwoc) | Salt (% bwoc) | Salt (% bwoc) | Amorphous Silica (% bwoc) | 24-Hr Compressive Strength at 80° F. (psi) |
|---|---|---|---|---|---|
| 1 | 39.41 | 4% CaCl$_2$ | — | — | 2,009 |
| 2 | 39.68 | 2% CaCl$_2$ | 2% AlCl$_3$ | 1% | 2,845 |
| 3 | 39.41 | 2% CaCl$_2$ | 2% AlCl$_3$ | — | 3,200 |
| 4 | 38.35 | 4% MgCl$_2$ | — | — | 2,470 |
| 5 | 39.15 | 2% MgCl$_2$ | 2% AlCl$_3$ | 1% | 2,800 |
| 6 | 38.35 | 2% MgCl$_2$ | 2% AlCl$_3$ | — | 2,940 |
| 7 | 39.86 | 4% NaCl | — | — | 1,603 |
| 8 | 39.56 | 2% NaCl | 2% AlCl$_3$ | 1% | 2,735 |
| 9 | 39.86 | 2% NaCl | 2% AlCl$_3$ | — | 3,210 |
| 10 | 40.56 | 4% KCl | — | — | 1,863 |
| 11 | 40.25 | 2% KCl | 2% AlCl$_3$ | 1% | 2,880 |
| 12 | 40.56 | 2% KCl | 2% AlCl$_3$ | — | 3,210 |

Therefore, Example 1 illustrates, inter alia, that the inclusion of aluminum chloride in combination with an alkali or alkaline-earth metal chloride in an embodiment of a cement composition of the present invention may provide improved compressive strength for the set cement composition.

Example 2

Sample cement compositions were prepared that comprised Portland Class H cement, various salts, and water, with and without amorphous silica. For each sample, an unfoamed cement slurry was first prepared by dry blending and then mixing with water for 35 seconds at 12,000 rpm in a Waring blender. The salts were not blended prior to combination with the cement. Thereafter, a surfactant composition (Foamer 760, available from Halliburton Energy Services, Inc.) was added in an amount of 2% by weight of the water, and each sample was foamed down to approximately 12 lb/gal using a stacked-blade assembly. After sample preparation, 24-hour compressive strength tests at 80° F. were performed in accordance with the procedures set forth in the API Specification 10 mentioned above.

The results of these tests are provided in the table below.

TABLE 2

| Sample No. | Water (% bwoc) | Salt (% bwoc) | Salt (% bwoc) | Amorphous Silica (% bwoc) | Foamed to (lb/gal) | 24-Hr Compressive Strength at 80° F. (psi) |
|---|---|---|---|---|---|---|
| 13 | 39.4 | 4% CaCl$_2$ | — | — | 11.15 | 916 |
| 14 | 41.5 | 2% CaCl$_2$ | 2% AlCl$_3$ | 1% | 11.78 | 1,538 |
| 15 | 39.4 | 2% CaCl$_2$ | 2% AlCl$_3$ | — | 11.84 | 1,628 |
| 16 | 43.5 | 4% MgCl$_2$ | — | — | 11.26 | 511 |
| 17 | 41.5 | 2% MgCl$_2$ | 2% AlCl$_3$ | 1% | 11.57 | 1,033 |
| 18 | 43.5 | 2% MgCl$_2$ | 2% AlCl$_3$ | — | 12.3 | 1,748 |
| 19 | 43.5 | 4% NaCl | — | — | 11.52 | 446 |
| 20 | 41.5 | 2% NaCl | 2% AlCl$_3$ | 1% | 11.6 | 1,093 |

TABLE 2-continued

| Sample No. | Water (% bwoc) | Salt (% bwoc) | Salt (% bwoc) | Amorphous Silica (% bwoc) | Foamed to (lb/gal) | 24-Hr Compressive Strength at 80° F. (psi) |
|---|---|---|---|---|---|---|
| 21 | 43.5 | 2% NaCl | 2% AlCl$_3$ | — | 12.23 | 1,447 |
| 22 | 43.5 | 4% KCl | — | — | 11.49 | 529 |
| 23 | 41.5 | 2% KCl | 2% AlCl$_3$ | 1% | | 784 |
| 24 | 43.5 | 2% KCl | 2% AlCl$_3$ | — | | 1,221 |

Therefore, Example 2 illustrates, inter alia, that the inclusion of aluminum chloride in combination with an alkali or alkaline-earth metal chloride in an embodiment of a foamed cement composition of the present invention may provide improved compressive strength for the set cement composition.

Example 3

A sample composition was prepared having a density of 16.4 lb/gal and comprised of Portland class H cement, hydrated calcium chloride in an amount of 4% bwoc, water. The composition was dry blended and then mixed with water for 35 seconds at 12,000 rpm in a Waring blender. The salts were not blended prior to combination with the cement. After sample preparation, 72-hour compressive strength tests at 80° F. were performed in accordance with the procedures set forth in the API Specification 10 mentioned above. The Young's Modulus of Elasticity and the Poisson's Ratio were determined in accordance with ASTM D3148-02.

Another sample composition was prepared having a density of 16.4 lb/gal and comprised of Portland class H cement, hydrated calcium chloride in an amount of 2% bwoc, hydrated aluminum chloride in an amount of 2% bwoc, and amorphous silica (SILICALITE™ cement additive, available form Halliburton Energy Services) in an amount of 1% bwoc, and water. The composition was dry blended and then mixed with water for 35 seconds at 12,000 rpm in a Waring blender. After sample preparation, 72-hour compressive strength tests at 80° F. were performed in accordance with the procedures set forth in the API Specification 10 mentioned above. The Young's Modulus of Elasticity and the Poisson's Ratio were determined in accordance with ASTM D3148-02.

The above tests with and without amorphous silica were repeated by replacing the calcium chloride with hydrated magnesium chloride, sodium chloride, and potassium chloride respectively.

The results of these tests are provided in the table below.

TABLE 3

| Sample No. | Water (% bwoc) | Salt (% bwoc) | Salt (% bwoc) | Amorphous Silica (% bwoc) | 72-Hour Comp. Strength at 80° F. (psi) | Young's Modulus | Poisson's Ratio |
|---|---|---|---|---|---|---|---|
| 25 | 39.41 | 4% CaCl$_2$ | — | — | 4,634 | 1.30E+06 | 0.206 |
| 26 | 39.68 | 2% CaCl$_2$ | 2% AlCl$_3$ | 1% | 5,932 | 1.41E+06 | 0.212 |
| 27 | 38.35 | 4% MgCl$_2$ | — | — | 4,591 | 1.56E+06 | 0.236 |
| 28 | 39.15 | 2% MgCl$_2$ | 2% AlCl$_3$ | 1% | 6,329 | 1.49E+06 | 0.245 |
| 29 | 39.86 | 4% NaCl | — | — | 4,945 | 1.13E+06 | 0.208 |
| 30 | 39.56 | 2% NaCl | 2% AlCl$_3$ | 1% | 5,727 | 1.22E+06 | 0.219 |
| 31 | 40.56 | 4% KCl | — | — | 4,312 | 1.39E+06 | 0.205 |
| 32 | 40.25 | 2% KCl | 2% AlCl$_3$ | 1% | 5,966 | 1.46E+06 | 0.197 |

Therefore, Example 3 illustrates, inter alia, that the inclusion of aluminum chloride in combination with an alkali or alkaline-earth metal chloride in an embodiment of a cement composition of the present invention may provide a cement having desirable mechanical properties.

Example 4

Sample cement compositions were prepared that comprised Portland Class H cement, various salts, and water, with and without amorphous silica. For each sample, an unfoamed cement slurry was first prepared by dry blending and then mixing with water for 35 seconds at 12,000 rpm in a Waring blender. The salts were not blended prior to combination with the cement. Thereafter, a surfactant composition (Foamer 760, available from Halliburton Energy Services, Inc.) was added in an amount of 2% by weight of the water, and each sample was foamed down to approximately 12 lb/gal using a stacked-blade assembly. After sample preparation, 24-hour compressive strength tests at 80° F. were performed in accordance with the procedures set forth in the API Specification 10 mentioned above.

The results of these tests are provided in the table below. It should be noted that the compressive strength shown in Table 4 are higher than those from Table 2 due to a three-day delay in measurement.

blended prior to combination with the cement. After sample preparation, 24-hour compressive strength tests at 80° F. were performed in accordance with the procedures set forth in the API Specification 10 mentioned above.

The above tests were repeated by removing the salts from each sample composition.

TABLE 4

| Sample No. | Water (% bwoc) | Salt (% bwoc) | Salt (% bwoc) | Amorphous Silica (% bwoc) | Foamed to (lb/gal) | Comp. Strength at 80° F. (psi) | Young's Modulus | Poisson's Ratio |
|---|---|---|---|---|---|---|---|---|
| 33 | 39.4 | 4% CaCl$_2$ | — | — | 11.15 | 1,705 | 7.25E+05 | 0.177 |
| 34 | 41.5 | 2% CaCl$_2$ | 2% AlCl$_3$ | 1% | 11.78 | 2,685 | 7.90E+05 | 0.201 |
| 35 | 43.5 | 4% MgCl$_2$ | — | — | 11.26 | 1,410 | 5.78E+05 | 0.167 |
| 36 | 41.5 | 2% MgCl$_2$ | 2% AlCl$_3$ | 1% | 11.57 | 2,176 | 7.22E+05 | 0.188 |
| 37 | 43.5 | 4% NaCl | — | — | 11.52 | 909 | 5.15E+05 | 0.160 |
| 38 | 41.5 | 2% NaCl | 2% AlCl$_3$ | 1% | 11.6 | 2,136 | 6.75E+05 | 0.210 |
| 39 | 43.5 | 4% KCl | — | — | 11.49 | 1,216 | 5.28E+05 | 0.187 |
| 40 | 41.5 | 2% KCl | 2% AlCl$_3$ | 1% | 11.34 | 1,970 | 6.17E+05 | 0.200 |

Therefore, Example 3 illustrates, inter alia, that the inclusion of aluminum chloride in combination with an alkali or alkaline-earth metal chloride in an embodiment of a foamed cement composition of the present invention may provide a cement having desirable mechanical properties.

Example 5

Sample Compositions were prepared having a density of 12.0 lb/gal and comprised of Portland class C cement, hydrated calcium chloride in an amount of 2% bwoc, hydrated aluminum chloride in an amount of 2% bwoc, and amorphous silica (SILICALITE™ cement additive, available form Halliburton Energy Services), and water. The compositions were dry blended and then mixed with water for 35 seconds at 12,000 rpm in a Waring blender. The salts were not The results of these tests are provided in the table below.

TABLE 5

| Sample No. | Water (% bwoc) | Amorphous Silica (% bwoc) | Salt (% bwoc) | Salt (% bwoc) | 24-Hr Compressive Strength at 80° F. (psi) |
|---|---|---|---|---|---|
| 41 | 134.34 | 10 | 2% CaCl$_2$ | 2% AlCl$_3$ | 194 |
| 42 | 139.21 | 15 | 2% CaCl$_2$ | 2% AlCl$_3$ | 198 |
| 43 | 136.83 | 10 | — | — | 157 |
| 44 | 141.70 | 15 | — | — | 128 |

Therefore, Example 5 illustrates, inter alia, that the inclusion of aluminum chloride in combination with an alkali or alkaline-earth metal chloride in an embodiment of a cement composition of the present invention may provide improved compressive strength for the set cement composition.

Example 6

Sample Compositions were prepared having a density of 15.2 lb/gal and comprised of Portland class H cement, a fluid loss control additive (HALAD™ 23 fluid loss additive, avail able from Halliburton Energy Services, Inc.) in an amount of 0.5% bwoc, hydrated calcium chloride in an amount of 2% bwoc, hydrated aluminum chloride in an amount of 2% bwoc, amorphous silica (SILICALITE™ cement additive, available form Halliburton Energy Services), and water. Various set retarders were also included in the sample compositions as indicated in the table below. The compositions were dry blended and then mixed with water for 35 seconds at 12,000 rpm in a Waring blender. The salts were not blended prior to combination with the cement. After sample preparation, fluid loss and thickening time tests were performed in accordance with the procedures set forth in the API Specification 10 mentioned above.

The results of these tests are provided in the table below.

TABLE 6

| Sample No. | Cement Set Retarder | Temp. (° F.) | Fluid Loss (cc/30 min) | Thickening Time (time to 70 Bc) |
|---|---|---|---|---|
| 45 | 0.25% bwoc[1] | 80 | 297 | 2 hrs 21 min |
| 46 | 0.054 gal/sack[2] | 120 | 330 | 2 hrs 2 min |

[1]The cement set retarder included in Sample 45 was HR ® -6L cement retarder, available from Halliburton Energy Services, Inc.
[2]The cement set retarder included in Sample 46 was the micromatrix cement retarder, available from Halliburton Energy Services, Inc.

Therefore, Example 6 illustrates, inter alia, that the embodiments of the cement compositions of the present invention may have desirable fluid loss and thickening time characteristics.

Example 7

Sample cement compositions were prepared that comprised Portland Class H cement, various salts, and water. The compositions were dry blended and then mixed with water for 35 seconds at 12,000 rpm in a Waring blender. The salts were not blended prior to combination with the cement. After sample preparation, 24-hour compressive strength tests at 80° F. were performed in accordance with the procedures set forth in the API Specification 10 mentioned above.

The results of these tests are provided in the table below.

TABLE 7

| Sample No. | $FeCl_3$ (% bwoc) | $CaCl_2$ (% bwoc) | KCl (% bwoc) | NaCl (% bwoc)) | $MgCl_2$ (% bwoc) | $AlCl_3$ (% bwoc) | 24-Hr Comp. Strength at 80° F. (psi) |
|---|---|---|---|---|---|---|---|
| 47 | 4% | — | — | — | — | — | 3,290 |
| 48 | 2% | — | — | — | — | 2% | 4,240 |
| 49 | 2% | — | — | — | 2% | — | 2,220 |
| 50 | 2% | 2% | — | — | — | — | 3,760 |
| 51 | 2% | — | 2% | — | — | — | 2,870 |
| 52 | 2% | — | — | 2% | — | — | 2,710 |

Therefore, Example 7 illustrates, inter alia, that the inclusion of aluminum chloride in combination with iron chloride in an embodiment of a cement composition of the present invention may provide improved compressive strength for the set cement composition.

Example 8

Sample cement compositions were prepared that comprised Portland Class H cement, various salts, and water. For each sample, an unfoamed cement slurry was first prepared by dry blending and then mixing with water for 35 seconds at 12,000 rpm in a Waring blender. Thereafter, a surfactant composition (Foamer 760, available from Halliburton Energy Services, Inc.) The salts were not blended prior to combination with the cement. was added in an amount of 2% by weight of the water, and each sample was foamed down to approximately 12 lb/gal using a stacked-blade assembly. After sample preparation, 24-hour compressive strength tests at 80° F. were performed in accordance with the procedures set forth in the API Specification 10 mentioned above.

The results of these tests are provided in the table below.

TABLE 8

| Sample No. | $FeCl_3$ (% bwoc) | $CaCl_2$ (% bwoc) | KCl (% bwoc) | NaCl (% bwoc)) | $MgCl_2$ (% bwoc) | $AlCl_3$ (% bwoc) | 24-Hr Comp. Strength at 80° F. (psi) |
|---|---|---|---|---|---|---|---|
| 53 | 4% | — | — | — | — | — | 1,002 |
| 54 | 2% | — | — | — | — | 2% | 1,737[1] |
| 55 | 2% | — | — | — | 2% | — | 1,304 |
| 56 | 2% | 2% | — | — | — | — | 1,284 |
| 57 | 2% | — | 2% | — | — | — | 908 |
| 58 | 2% | — | — | 2% | — | — | 903 |

[1]To minimize standard deviation, compressive strength tests for Sample No. 54 were run with three cylinders rather than two.

Therefore, Example 8 illustrates, inter alia, that the inclusion of aluminum chloride in combination with an alkali or alkaline-earth metal chloride in a foamed cement composition may provide improved compressive strength for the set cement composition Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method of cementing in a subterranean formation comprising:
 introducing an unfoamed cement composition into the subterranean formation, wherein the cement composition comprises:
 cement;

a strength-enhancing additive consisting of aluminum chloride and iron chloride and
water; and
allowing the unfoamed cement composition to set.

2. The method of claim 1 comprising preparing the unfoamed cement composition by a process that comprises mixing components comprising the cement, the strength-enhancing additive, and the water.

3. The method of claim 2 wherein the process for preparing the unfoamed cement composition comprises dry blending the strength-enhancing additive and the cement without prior combination of the aluminum chloride and the metal halide.

4. The method of claim 1 wherein introducing the unfoamed cement composition into the subterranean formation comprises introducing the unfoamed cement composition into a space between a well bore wall and a pipe string.

5. The method of claim 1 wherein the cement comprises a hydraulic cement.

6. The method of claim 1 wherein the iron chloride comprises ferric chloride.

7. The method of claim 1 wherein the iron chloride is present in the unfoamed cement composition in an amount of about 1% to about 5% by weight of the cement, and wherein the aluminum chloride is present in the unfoamed cement composition in an amount of about 1% to about 5% by weight of the cement.

8. The method of claim 1, wherein the unfoamed cement composition further comprises:
at least one additive selected from the group consisting of strength-retrogression additives, cement set retarders, fluid-loss control additives, weighting agents, weight-reducing additives, heavyweight additives, lost-circulation materials, filtration-control additives, dispersants, defoaming agents, surfactants, and combinations thereof.

9. The method of claim 8 wherein introducing the unfoamed cement composition into the subterranean formation comprises introducing the cement composition into a space between a well bore wall and a pipe string.

10. The method of claim 8 wherein the iron chloride comprises ferric chloride.

11. The method of claim 1 wherein the unfoamed cement composition further comprises at least one additive selected from the group consisting of surfactants, crystalline silica, amorphous silica, salts, fibers, hydratable clays, vitrified shale, microspheres, fly ash, lime, latex, thixotropic additives, and combinations thereof.

12. The method of claim 11 wherein introducing the unfoamed cement composition into the subterranean formation comprises introducing the cement composition into a space between a well bore wall and a pipe string.

13. The method of claim 11 wherein the iron chloride comprises ferric chloride.

14. A method of cementing in a subterranean formation comprising:
providing a cement composition that comprises cement, a strength-enhancing additive consisting of aluminum chloride and iron chloride, and water;
introducing the cement composition into the subterranean formation; and
allowing the cement composition to set.

15. The method of claim 14 wherein preparing the cement composition comprises dry blending the aluminum chloride and the iron chloride with the cement.

16. The method of claim 14 wherein the iron chloride comprises ferric chloride.

17. The method of claim 14 wherein the iron chloride is present in the cement composition in an amount of about 1% to about 5% by weight of the cement, and wherein the aluminum chloride is present in the cement composition in an amount of about 1% to about 5% by weight of the cement.

18. A method of cementing in a subterranean formation comprising:
providing a cement composition that comprises cement, a strength-enhancing additive consisting of aluminum chloride and iron chloride, a surfactant, and water; and
introducing a gas into the cement composition to form a foamed cement composition;
introducing the foamed cement composition into the subterranean formation; and
allowing the cement composition to set.

19. The method of claim 18 wherein the gas is present in the foamed cement composition in an amount of about 5% to about 80% by volume of the foamed cement composition at atmospheric pressure.

20. The method of claim 18 wherein the cement composition comprises the iron chloride in an amount of about 1% to about 5% by weight of the cement, and wherein the aluminum chloride is present in the cement composition in an amount of about 1% to about 5% by weight of the cement.

21. A method of cementing in a subterranean formation comprising:
providing a cement composition;
increasing the compressive strength of the cement composition using an effective amount of a strength-enhancing additive consisting of aluminum chloride and iron chloride, wherein the cement composition comprises cement, water, and the strength-enhancing additive;
introducing the cement composition into the subterranean formation; and
allowing the cement composition to set.

22. The method of claim 21 wherein introducing the cement composition into the subterranean formation comprises introducing the cement composition into a space between a well bore wall and a pipe string.

23. The method of claim 21 wherein the iron chloride comprises ferric chloride.

24. The method of claim 21 wherein the iron chloride is present in the cement composition in an amount of about 1% to about 5% by weight of the cement, and wherein the aluminum chloride is present in the cement composition in an amount of about 1% to about 5% by weight of the cement.

* * * * *